United States Patent [19]
Bier

[11] Patent Number: 5,676,099
[45] Date of Patent: Oct. 14, 1997

[54] MULTICYLINDER INTERNAL COMBUSTION ENGINE AND METHOD OF OPERATING SAME

[75] Inventor: Manfred Bier, Eberdingen, Germany

[73] Assignees: Ing. h.c.F. Porsche AG, Weissach, Germany; Regie Nationale des Usines Renault S.A., Cedéx, France

[21] Appl. No.: 644,819

[22] Filed: May 10, 1996

[30] Foreign Application Priority Data

May 22, 1995 [EP] European Pat. Off. .............. 95107777

[51] Int. Cl.⁶ .............................. F01L 1/26; F01L 1/344; F02D 13/02
[52] U.S. Cl. ...................................... 123/90.15; 123/90.17
[58] Field of Search ............................. 123/90.15, 90.16, 123/90.17, 90.31

[56] References Cited

U.S. PATENT DOCUMENTS

| | | | |
|---|---|---|---|
| 4,703,734 | 11/1987 | Aoyama et al. | 123/90.15 |
| 4,860,709 | 8/1989 | Clarke et al. | 123/90.15 |
| 5,230,320 | 7/1993 | Hitomi et al. | 123/90.15 |
| 5,421,308 | 6/1995 | Hitomi et al. | 123/90.15 |
| 5,450,824 | 9/1995 | Yamane et al. | 123/90.15 |

FOREIGN PATENT DOCUMENTS

| | | |
|---|---|---|
| 0147209 | 7/1985 | European Pat. Off. . |
| 0338729A1 | 10/1989 | European Pat. Off. . |
| 0529639A1 | 3/1993 | European Pat. Off. . |
| 0594463A1 | 4/1994 | European Pat. Off. . |
| 3600408C2 | 7/1987 | Germany . |
| 4332616A1 | 3/1994 | Germany . |

OTHER PUBLICATIONS

European Search Report, Nov. 15, 1995.

*Primary Examiner*—Weilun Lo
*Attorney, Agent, or Firm*—Evenson McKeown Edwards & Lenahan, PLLC

[57] ABSTRACT

An internal combustion engine at least two intake valves and one exhaust valve per cylinder. The valves are actuated by an intake camshaft and an exhaust camshaft operating with variable timings. The internal combustion engine is also provided with an intake system having separate intake ducts leading to the intake valves. One control flap is provided in at least one intake duct. To optimize the operation of the internal combustion engine with regard to exhaust emissions, fuel consumption, performance, and torque, the timings of the valves and the throughputs of the intake ducts are influenced as a function of the defined characteristic map areas of a torque-rpm graph.

12 Claims, 3 Drawing Sheets

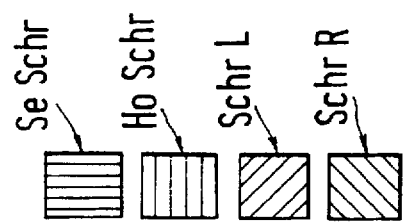
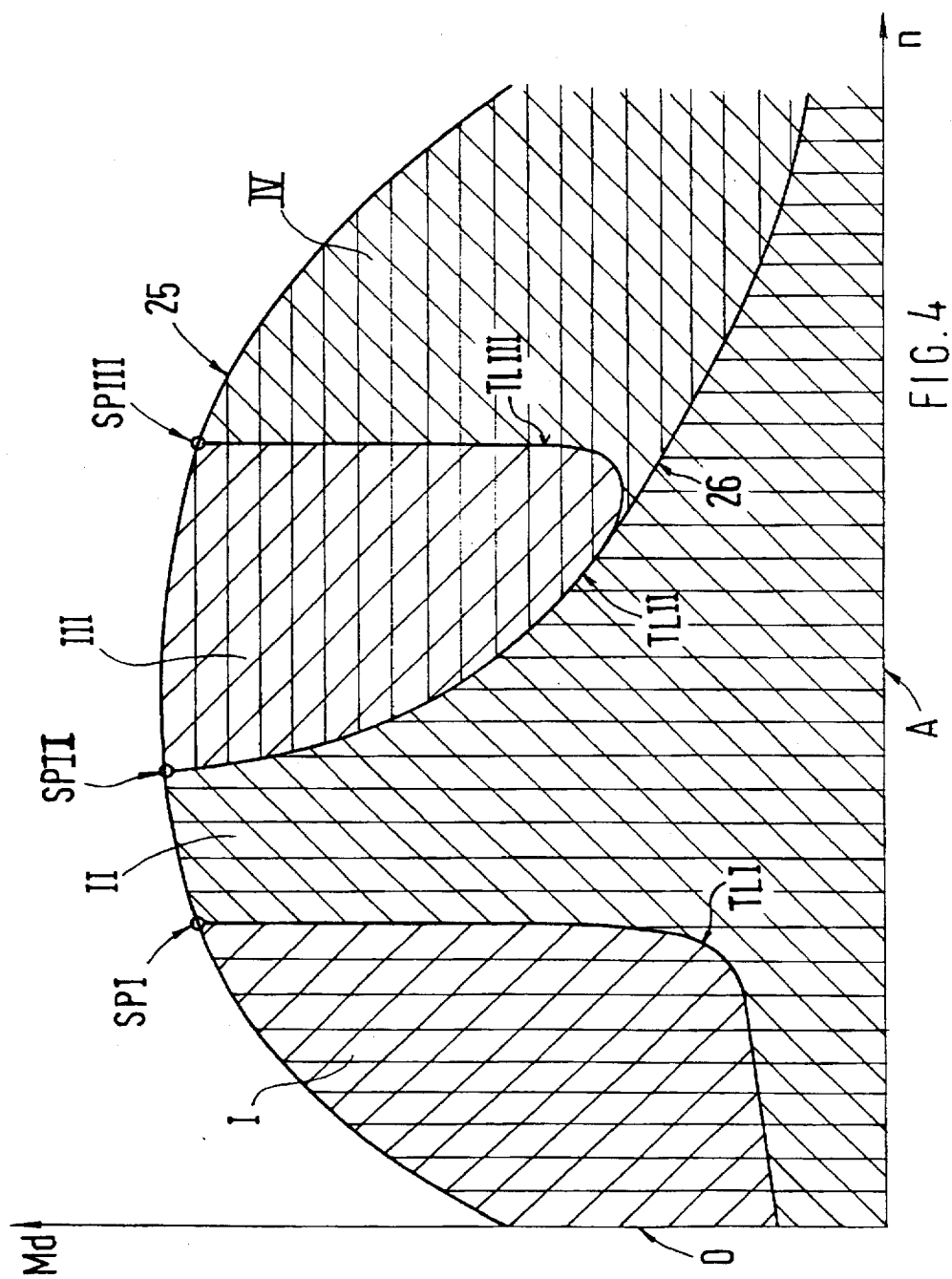

MULTICYLINDER INTERNAL COMBUSTION ENGINE AND METHOD OF OPERATING SAME

BACKGROUND AND SUMMARY OF THE INVENTION

The invention relates to a multicylinder internal combustion engine of the reciprocating piston type, with at least two intake valves and one exhaust valve per cylinder.

In a known internal combustion engine of the above type described in German Patent Document DE 36 00 408, three intake valves are provided, with an intake duct leading to each intake valve. The intake ducts are of different diameters and lengths, and each intake duct is provided with a control flap. In addition, the control times of the intake valves are made variable. In this design, the cost of the large number of control flaps and different intake ducts as well as the obviously complicated manner of changing the control times of the intake valves is extremely high.

An object of the invention is to perform highly efficient actuation of the control flaps in the intake ducts and to adjust the timings of the intake valves at acceptable cost in such fashion that the operation of the internal combustion engine is optimized, especially as regards exhaust emissions, fuel consumption, performance, and torque.

This object is achieved according to preferred embodiments of the invention by providing an arrangement wherein timings of the intake and exhaust valves and throughputs of the intake ducts are controlled as a function of defined characteristic map areas of a torque versus engine speed graph depicting engine operation conditions.

Primary advantages achieved by the invention include optimization of engine operation over the entire working range, with a favorable effect on stable idling, exhaust emissions, fuel consumption, and performance and torque of said engine. The control valves of one intake duct and the adjustment of the timings—advanced or retarded—of the intake valves are controlled by easily achievable characteristic map areas of a torque-rpm graph. The provisions for controlling the intake duct are easy to show, since only two intake ducts and only one control flap are required per cylinder. Logically, this also applies to setting the timings of the intake valves, for which a conventional adjusting device can be used. The latter is also known as an "axial adjuster" as described for example in European Patent Document EP 0 147 209 A2.

Other objects, advantages and novel features of the present invention will become apparent from the following detailed description of the invention when considered in conjunction with the accompanying drawings.

BRIEF DESCRIPTION OF THE DRAWINGS

FIG. 4 is a torque-rpm graph of the engine; and

FIG. 5 is an explanatory diagram of the graph in FIG. 4.

DETAILED DESCRIPTION OF THE DRAWINGS

Figure 1:
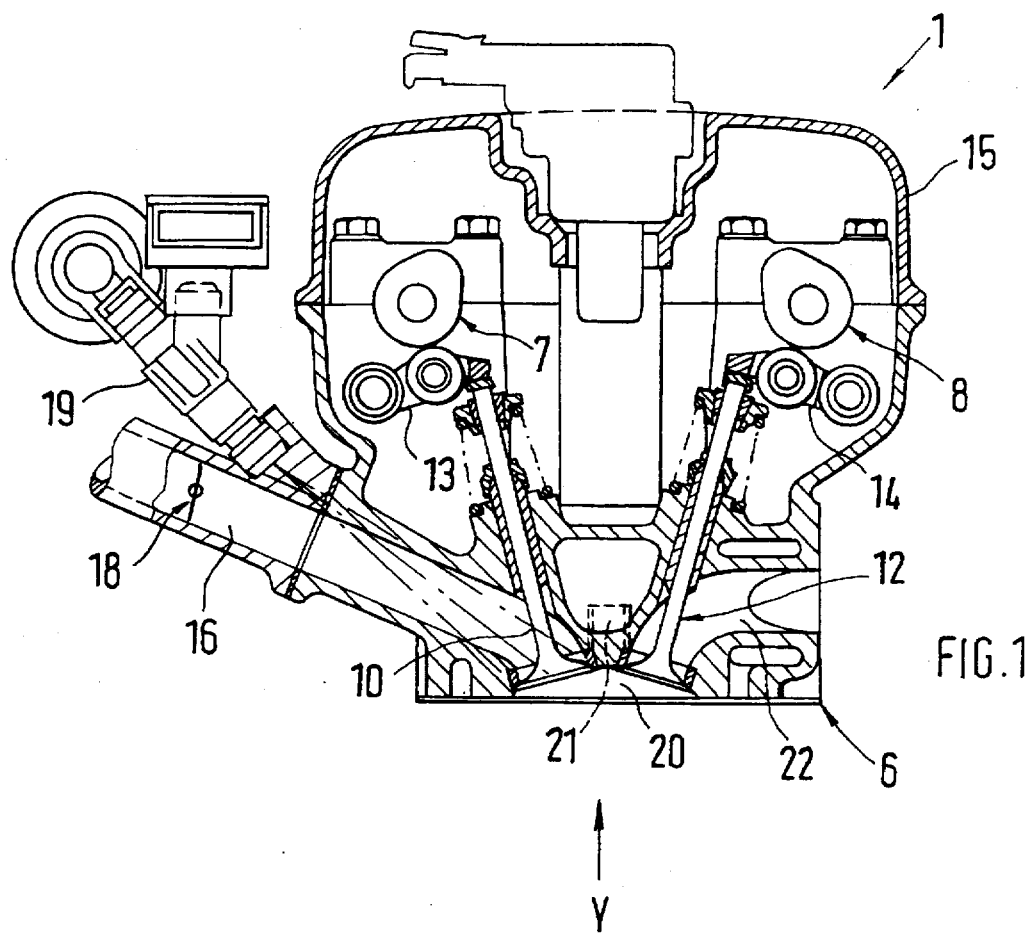
FIG. 1 is a partial cross sectional view of an internal combustion engine in the vicinity of a cylinder head, constructed according to a preferred embodiment of the present invention.

An internal combustion engine 1 of a four-cycle design, with a displacement between 800 and 1100 $cm^2$ for example, comprises four cylinders 2, 3, 4, 5 and a cylinder head 6 on top, with an intake camshaft 7 and an exhaust camshaft 8. Two intake valves 9, 10 and two exhaust valves 11, 12 are provided per cylinder. Camshafts 7, 8 operate valves 9, 10, 11, 12 through roller cam followers 13, 14. The numeral 15 refers to a cover that covers cylinder head 6.

Two separate intake ducts 16, 17 lead respectively to each of intake valves 9, 10, with a control flap 18 being provided in only one intake duct in the embodiment shown, intake duct 16 for example. To perform special engine functions, however, it is also contemplated to provide control flaps in both intake ducts in certain preferred embodiments of the invention. Fuel is supplied through injector nozzles 19. The fuel-air mixture that enters a combustion chamber through intake valves 9, 10 and is ignited there by a centrally located spark plug 21 escapes as exhaust when exhaust valves 11, 12 are open, through exhaust duct 22 into the exhaust system of engine 1, not shown in greater detail.

Figure 3:
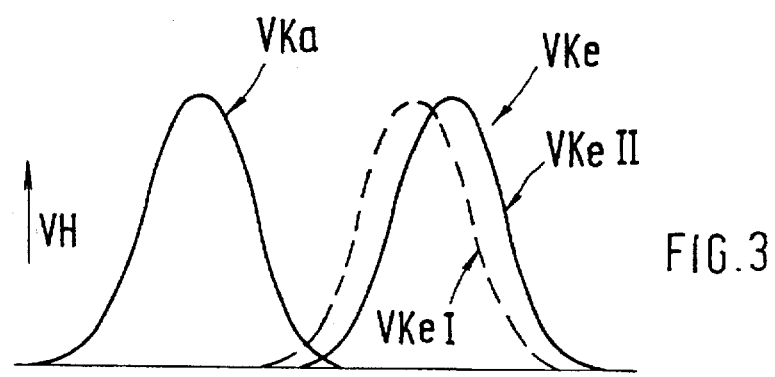
FIG. 3 is a graph of the timings of the intake valves and exhaust valves of the engine.
Figure 2:
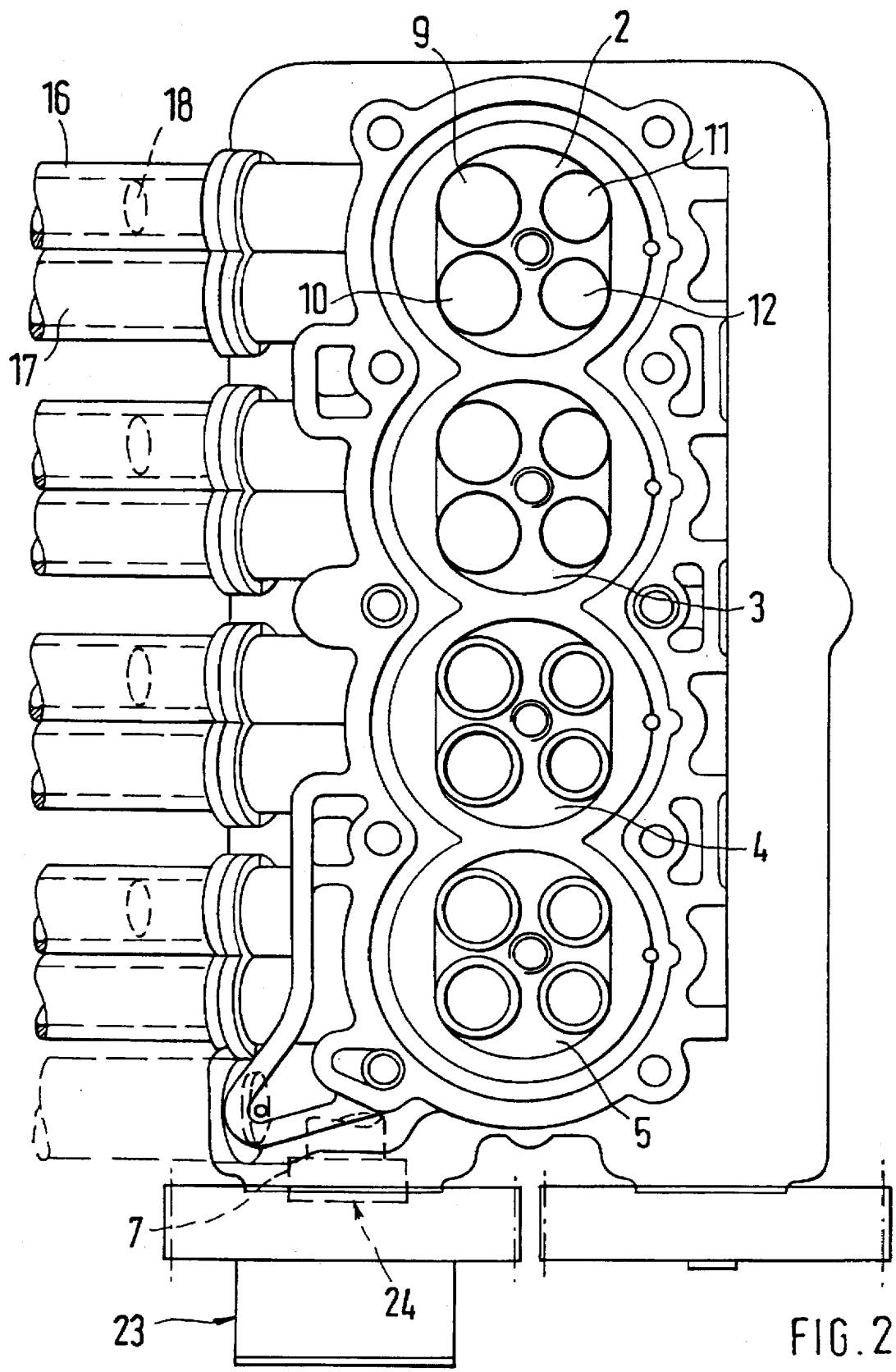
FIG. 2 is a view looking in the direction of arrow Y in FIG. 1.

The timings of intake valves 9, 10 are made adjustable relative to the timings of exhaust valves 11, 12, as shown in FIG. 3. Valve lift curve VKa gives the timings of exhaust valves 11, 12 while valve lift curve VKe shows the timings of intake valves 9, 10; VH is the valve lift. It is evident that the timings of valve lift curve VKe are adjustable; dashed valve lift curve VKeI is advanced, while the solid valve lift curve VKeII is set in a retarded position or is retarded. In this connection, the term "advanced" refers to advanced intake opening and closing and "retarded" refers to retarded intake opening and closing.

The timings of intake valves 9, 10 are adjusted by varying the relative rotational position of intake camshaft 7 with respect to exhaust camshaft 8. An adjusting device 23 is used for this purpose, such as described in European Patent Document EP 0 147 209 A2. Adjusting device 23 is located outside cylinder head 6 at one end 24 of intake camshaft 7.

FIG. 4 shows the torque-rpm graph of internal combustion engine 1, with torque Md being plotted on ordinate O and the rpm (engine rotational speed in resolutions per minute) being plotted on abscissa A. The numeral 25 marks a full load line below which characteristic map areas I, II, III and IV extend. Characteristic map area I is delimited by a part of full load line 25, a part of ordinate O, and an angular separating line TLI, with the latter contacting full load line 25 at a first shift point SPI. Characteristic map area II is delimited by separating line TL1, by abscissa A, by a part of full load line 25, and by a separating line TLII that partially represents throttle line 26 between intake ducts 16, 17; a second shift point being indicated by SPII. Characteristic map area III is delimited by a portion of full load line 25 and a third separating line TLIII which begins at shift point SPII, runs in sections along throttle line 26, and then contacts full road line 25 at a third shift point SPIII. Finally, characteristic map area IV is defined by a part of full load line 25, a part of separating line TLIII, and a part of throttle line 26. The positions of shift points SPI, SPII, and SPIII as well as the shape of separating lines TLI, TLII, and TLIII are determined empirically or by calculation.

For a clear representation of the control functions of the control flap and the timings of intake valves 9, 10 in the torque-rpm graph, characteristic map areas I, II, III and IV have been shaded accordingly and have the following meanings according to FIG. 5:.

Vertical shading—Se Schr—one intake duct closed
Horizontal shading—Ho Schr—both intake ducts open
Diagonal shading—SchrL—intake camshaft early (upper left to lower right)

Diagonal shading—SchrR—intake camshaft late, (upper right to lower left)

During operation of engine 1, the following functions occur depending on defined characteristic map areas I, II, III, and IV:

In first characteristic map area I, first intake duct 17 is open and second intake duct 16 is closed, with the timings of intake valves 9, 10 being advanced;

In second characteristic map area II, first intake duct 17 is open and the second intake duct is closed, with the timings of intake valves 9, 10 being retarded;

In third characteristic map area III, both intake ducts 16, 17 are open, with the timings of intake valves 9, 10 being advanced;

In fourth characteristic map area IV, both intake ducts 16, 17 are open, with the timings of intake valves 9, 10 being retarded.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Multicylinder internal combustion engine of the reciprocating piston type, comprising:
   at least two intake valves and one exhaust valve per cylinder,
   intake and exhaust camshafts located in a cylinder head above the cylinders and actuating the valves, said camshafts operating with variable timings, and
   an intake system with separate intake ducts leading to the intake valves, with a control flap being provided in at least one intake duct,
   wherein the timings of the intake and exhaust valves and throughputs of the intake ducts are controlled as a function of defined characteristic map areas of a torque versus engine speed graph depicting engine operating conditions;
   wherein, in a first characteristic map area, a first intake duct is open and a second intake duct is closed, with the timings of the intake valves being advanced;
   wherein, in a second characteristic map area, the first intake duct is open and the second intake duct is closed, with the timings of the intake valves being retarded;
   wherein, in a third characteristic map area, both intake ducts are open, with the timings of the intake valves being advanced; and
   wherein, in a fourth characteristic map area, both intake ducts are open, with the timings of the intake valves being retarded.

2. Multicylinder internal combustion engine according to claim 1, wherein that the relative rotary position of the intake camshaft and the actuation of a control flap in an intake duct are changed as a function of engine load and speed.

3. Multicylinder internal combustion engine according to claim 1, wherein the timings of the intake valves are adjusted by changing relative rotary positions of the intake camshaft with respect to the exhaust camshaft.

4. Multicylinder internal combustion engine according to claim 1, wherein a control flap is provided in only one intake duct.

5. Multicylinder internal combustion engine according to claim 3, wherein that the relative rotary position of the intake camshaft and the actuation of a control flap in an intake duct are changed as a function of engine load and speed.

6. Multicylinder internal combustion engine according to claim 5, wherein a control flap is provided in only one intake duct.

7. Multicylinder internal combustion engine according to claim 3, comprising an adjusting device for changing the relative rotary position of the intake camshaft.

8. Multicylinder internal combustion engine according to claim 7, wherein the adjusting device is located at one end of the intake camshaft.

9. A method of operating a multicylinder internal combustion engine of the reciprocating engine type which includes:
   at least two intake valves and one exhaust valve per cylinder,
   intake and exhaust camshafts located in a cylinder head above the cylinders and actuating the valves, said camshafts being operable with variable timings, and
   an intake system with separate intake ducts leading to the intake valves, with a control flap being provided in at least one intake duct,
   said method comprising:
   controlling the timings of the intake and exhaust valves and the throughputs of the intake ducts as a function of defined characteristic map areas of a torque versus engine speed graph depicting engine operating conditions;
   wherein, in a first characteristic map area, a first intake duct is open and a second intake duct is closed, with the timings of the intake valves being advanced;
   wherein, in a second characteristic map area, the first intake duct is open and the second intake duct is closed, with the timings of the intake valves being retarded;
   wherein, in a third characteristic map area, both intake ducts are open, with the timings of the intake valves being advanced; and
   wherein, in a fourth characteristic map area, both intake ducts are open, with the timings of the intake valves being retarded.

10. A method according to claim 9, wherein the timings of the intake valves are adjusted by changing relative rotary positions of the intake camshaft with respect to the exhaust camshaft.

11. A method according to claim 9, wherein a control flap is provided in only one intake duct.

12. A method according to claim 9, wherein that the relative rotary position of the intake camshaft and the actuation of a control flap in an intake duct are changed as a function of engine load and speed.

* * * * *